United States Patent
Bogineni et al.

(10) Patent No.: US 9,071,927 B2
(45) Date of Patent: Jun. 30, 2015

(54) COLLAPSED MOBILE ARCHITECTURE

(75) Inventors: Kalyani Bogineni, Hillsborough, NJ (US); Nabil N. Bitar, Acton, MA (US); Samir Ait-Ameur, Fremont, CA (US); Praveen Atreya, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 229 days.

(21) Appl. No.: 13/310,834

(22) Filed: Dec. 5, 2011

(65) Prior Publication Data

US 2013/0142166 A1  Jun. 6, 2013

(51) Int. Cl.
*H04W 8/02* (2009.01)
*H04W 84/02* (2009.01)
*H04W 80/04* (2009.01)
*H04B 7/26* (2006.01)
*H04L 12/801* (2013.01)

(52) U.S. Cl.
CPC ............... *H04W 8/02* (2013.01); *H04W 80/04* (2013.01); *H04B 7/2606* (2013.01); *H04L 47/10* (2013.01); *H04W 84/02* (2013.01)

(58) Field of Classification Search
CPC . H04W 28/0226; H04W 36/00; H04W 24/00; H04L 12/4641; H04L 29/12028
USPC .......................... 370/252, 328, 331, 392, 477
See application file for complete search history.

(56) References Cited

U.S. PATENT DOCUMENTS

| | | | | |
|---|---|---|---|---|
| 6,973,057 | B1 * | 12/2005 | Forslow | 370/328 |
| 7,035,287 | B2 * | 4/2006 | Tourunen et al. | 370/477 |
| 8,792,408 | B2 * | 7/2014 | Racz et al. | 370/315 |
| 2012/0014386 | A1 * | 1/2012 | Xiong et al. | 370/392 |
| 2012/0182936 | A1 * | 7/2012 | Haddad et al. | 370/328 |
| 2012/0269162 | A1 * | 10/2012 | Vesterinen et al. | 370/331 |
| 2013/0083677 | A1 * | 4/2013 | Kim et al. | 370/252 |

* cited by examiner

*Primary Examiner* — Jung Park
*Assistant Examiner* — Chuong M Nguyen

(57) ABSTRACT

A collapsed or compact mobile architecture system includes connection nodes each comprising an access interface and at least one network interface; a backhaul network coupled to each of the connection nodes; and a mobility control unit coupled to the backhaul network. The mobility control unit comprises an Internet Protocol (IP) address server. Each of the connection nodes is configured to receive attachment requests from at least one user device. The mobility control unit is configured to receive first control plane signals from the connection nodes based on the attachment requests and transmit second control plane signals to the connection nodes based on the attachment requests. The mobility control unit is further configured to assign an IP address to each of the at least one user devices, based on the receive first control plane signals.

20 Claims, 11 Drawing Sheets

COLLAPSED MOBILE ARCHITECTURE

BACKGROUND

Current Long Term Evolution (LTE)-based networks include a variety of devices, such as enhanced Node Bs (eNBs), mobility management entities (MMEs), packet gateways (PGWs), and serving gateways (SGW). Current Third Generation Partnership Project (3GPP) and LTE standards require the PGW to function or serve as an anchoring point for any user equipment (UE). That is, all traffic between the UEs and the Internet necessarily travels through the anchor PGW. However, the anchoring function of the PGW is static and cannot be combined with the functionality of the SGWs, the MMEs, and/or the eNBs. Furthermore, anchoring UEs (e.g., anchoring bearer paths associated with UEs) at a particular PGW increases transport cost and resource utilization at the particular PGW. This causes network transport and PGW resources to be inefficient at handling large traffic loads when the network grows to include a large number of eNBs or larger bandwidth per user.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

According to embodiments described herein, a high speed mobile network having a significantly simplified architecture, may enable efficient transmission of data without undesirable overhead requirements or centralized bottlenecks resulting from a hierarchical network configuration. As described below, such a mobile architecture may include a plurality of distributed and interconnected connection nodes (CNs) operatively coupled to a mobility control unit (MCU) and a packet data network (PDN) (e.g., the Internet) via an IP backhaul network. User devices (termed user equipment (UEs) herein) may connect or attach to the CNs via any of a number of suitable access technologies. In this manner, the described architecture may be considered to be access agnostic. Once attached, the UEs may each communicate, directly or indirectly, with the MCU via one of the CNs to authenticate with the network and receive an IP address assigned by the MCU. The UEs may then transmit IP data to the PDN directly via the CNs using the assigned IP address.

Figure 1:
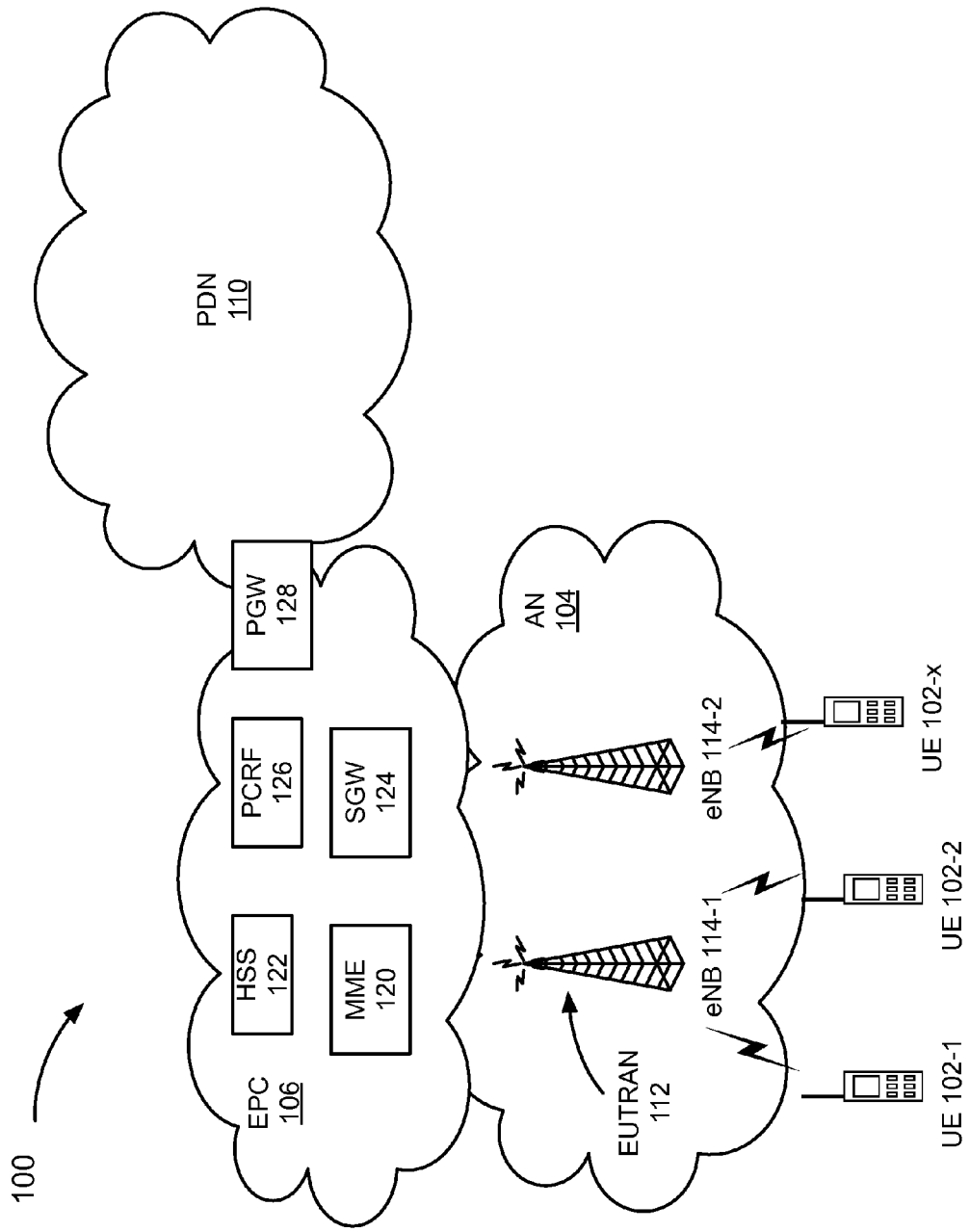
FIG. 1 is a diagram of an exemplary long term evolution (LTE) network.

FIG. 1 is a diagram of an exemplary long term evolution (LTE) network 100. As illustrated, LTE network 100 includes a number of user equipment (UE) devices 102-1, 102-2 and 102-x (collectively referred to as UEs 102 or individually as UE 102), an access network 104, an evolved packet core (EPC) 106, and a packet data network (PDN) 110, such as the Internet or a proprietary packet data network. Access network (AN) 104 may include an evolved universal terrestrial radio access network (E-UTRAN) 112 and a number of eNodeBs (eNBs) 114-1 and 114-2 (collectively referred to as eNBs 114 or individually as eNB 114). EPC 106 may include a mobility management entity (MME) 120, a home subscriber server (HSS)/authentication, authorization, and accounting (AAA) server 122, a serving gateway (SGW) 124, policy and charging rules function (PCRF) device 126, and a PDN gateway (PGW) 128. Devices/networks of network 100 may interconnect via wired and/or wireless connections.

Three UEs 102, access network 104, EPC 106, PDN 110, E-UTRAN 112, two eNBs 114, MME 120, HSS 122, SGW 124, PCRF 126, PGW 128 have been illustrated in FIG. 1 for simplicity. In practice, there may be more or fewer devices or components. For example, a typical network 100 includes millions of subscriber UEs 102, thousands of eNBs 114, hundreds of SGWs 124 and several PGWs 128 effectively forming a hierarchical access network in which traffic passes from PDN 110 to UE 102 via a particular PGW 128, SGW 124, and eNB 114.

UE 102 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer, a personal computer, or other types of computation or communication devices. In an exemplary implementation, UEs 102 may include any device that is capable of communicating over access network 104, EPC network 106, and/or PDN 110. UE 102 operates according to one or more versions of the LTE communication standard.

Access network 104 includes a communications network that connects subscribers (e.g., UE 102) to a service provider. In one example, access network 104 may include a WiFi network or other access networks (e.g., in addition to E-UTRAN 112). EPC 106 includes a core network architecture of the 3GPP LTE wireless communication standard. PDN 110 includes a network that provides data services (e.g., via packets or any other IP datagrams). For example, PDN 110 may include the Internet, an intranet, an asynchronous transfer mode (ATM) network, etc.

E-UTRAN 112 includes a radio access network capable of supporting high data rates, packet optimization, large capacity and coverage, etc. eNBs 114 includes network devices that operate according to one or more versions of the LTE communication standard. For example, eNBs 114 may be configured to respond to UE requests, forward information regarding UEs 102 to MME 120 and/or SGW 124, set up tunneling sessions with other devices (e.g., SGW 124 and PGW 126), etc.

MME 120 is responsible for idle mode tracking and paging procedures (e.g., including retransmissions) for UE 102. For example, MME 120 maintains information regarding a current state (e.g., powered on, location, etc.) of UE 102. MME 120 is also involved in the bearer activation/deactivation process (e.g., for UE 102) and operates to choose a particular SGW 124 for UE 102 at an initial attach and at a time of intra-LTE handover. In addition, MME 120 authenticates UE 102 (e.g., via interaction with HSS 122). Non-access stratum (NAS) signaling terminates at MME 120 and MME 120 generates and allocates temporary identities to UEs (e.g., UE 102).

Furthermore, MME 120 may check authorization of UE 102 to connect to a service provider's Public Land Mobile Network (PLMN) and may enforce roaming restrictions for UE 102. MME 120 may be a termination point in EPC network 106 for ciphering/integrity protection for NAS signaling and may handle security key management. MME 120 may provide a control plane function for mobility between LTE and 2G/3G 3GPP access networks with an S3 interface terminating at MME 120. MME 120 may also terminate an S6a interface towards HSS 122 for roaming UEs.

HSS/AAA 122 is configured to include a master user database that supports devices on PDN 110 that handle calls, such as proxy devices, session border controllers, etc. HSS/AAA 122 may contain subscription-related information (e.g., subscriber profiles), may perform authentication and authorization of a user based on requests received from MME 120, and may provide information about a subscriber's location and IP information.

SGW 124 routes and forwards user data packets, acts as a radio mobility anchor for a user plane during inter-eNB handovers, and also acts as an radio anchor for mobility between LTE and other 3GPP technologies (referred to as "inter-3GPP mobility"). As shown, SGW 124 is connected to eNBs 114 to provide a radio layer mobility control plane. In addition, SGW 124 manages and stores contexts associated with UE 102 (e.g., parameters of an IP bearer service, network internal routing information, etc.).

PCRF 126 provides policy control decision and flow based charging control functionalities. PCRF 126 may provide network control regarding service data flow detection, gating, quality of service (QoS) and flow based charging, etc. PCRF 126 may determine how a certain service data flow shall be treated, and may ensure that user plane traffic mapping and treatment is in accordance with a user's subscription profile.

PGW 128 includes one or more data transfer devices (or network devices), such as a gateway, a router, a switch, a firewall, a network interface controller (NIC), a hub, a bridge, a proxy server, an optical add/drop multiplexer OADM, or some other type of device that processes and/or transfers data. PGW 128 provides connectivity of UE 102 to external packet data networks (e.g., to PDN 110) by being a traffic exit/entry point for UE 102. As described briefly above, UE 102 may connect to PGW 128 via one or more tunnels established between eNB 114 and PGW 128, such as one or more GPRS Tunneling Protocol (GTP) tunnels. UE 102 may simultaneously connect to more than one PGW for accessing multiple PDNs. PGW 128 may perform policy enforcement, packet filtering for each user, charging support, lawful intercept, and packet screening. PGW 128 may also act as an anchor for mobility between 3GPP and non-3GPP technologies.

Figure 2:
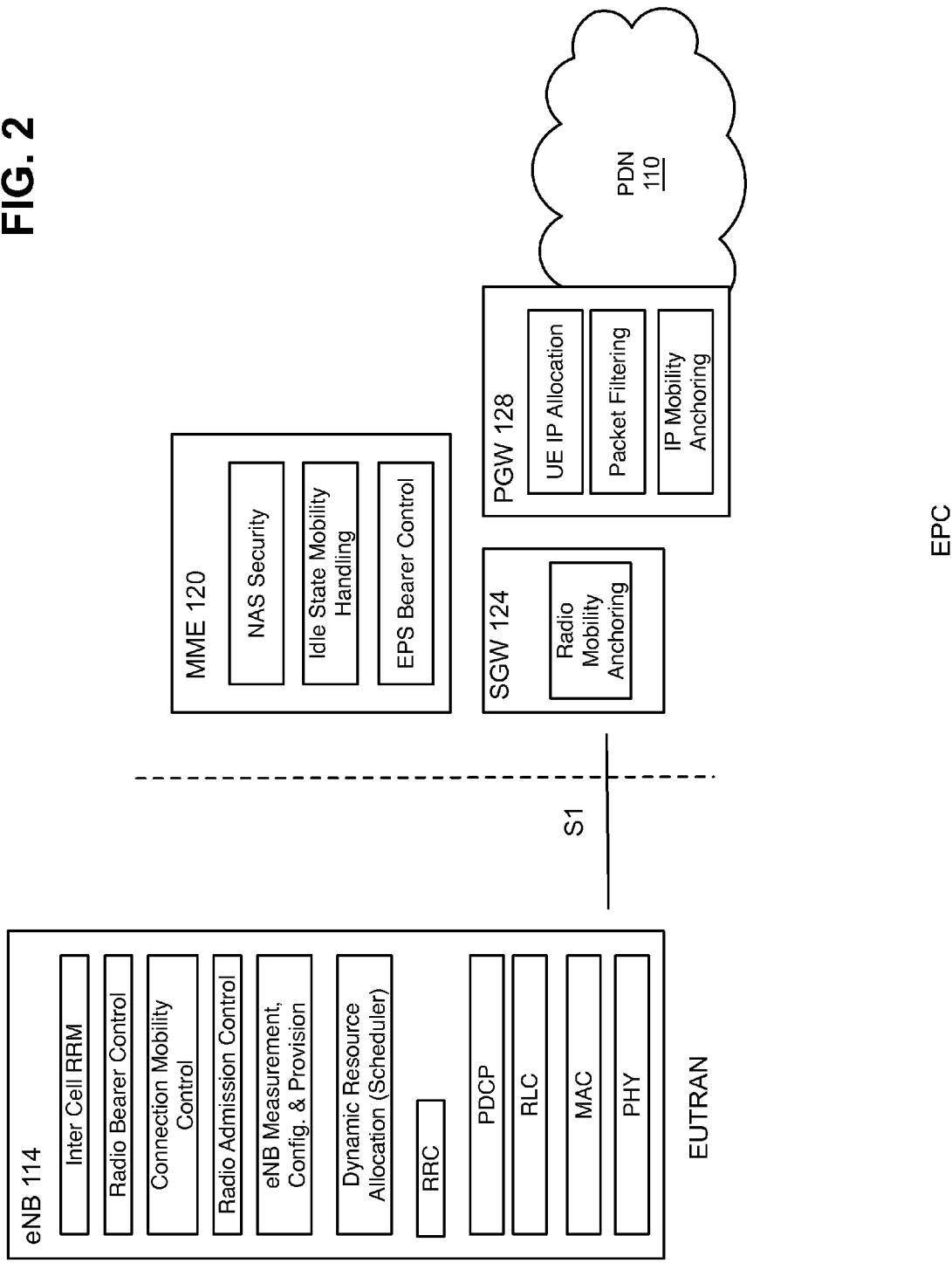
FIG. 2 is a block diagram showing the functional split between the eNB and the Evolved Packet Core (EPC) in FIG. 1.

FIG. 2 is a block diagram showing the functional split between the eNB 114 and EPC 106. As shown, eNB 114 hosts functions for Radio Resource Management (RRM) such as Radio Bearer (RB) Control, Radio Admission Control, Connection Mobility Control, Dynamic allocation of resources to UEs in both uplink and downlink (scheduling), and eNB measurement, configuration, and provisioning. eNB 114 also hosts functions for IP (Internet Protocol) header compression and encryption of user data stream, routing of user plane information data towards SGW 124, the scheduling and transmission of paging messages to MME 120, the scheduling and transmission of broadcast information, and the measurement and measurement reporting configuration for mobility and scheduling.

MME 120 hosts the functions for NAS signaling, NAS signaling security, idle mode UE reachability, tracking area list management, roaming, authentication, and initiating the establishment of EPS bearers between SGWs and PGWs and between SGWs and eNBs. SGW 124 hosts functions for radio mobility anchoring. PGW 128 hosts functions for UE IP address allocation, packet filtering, IP mobility anchoring, and lawful interception.

Figure 3:
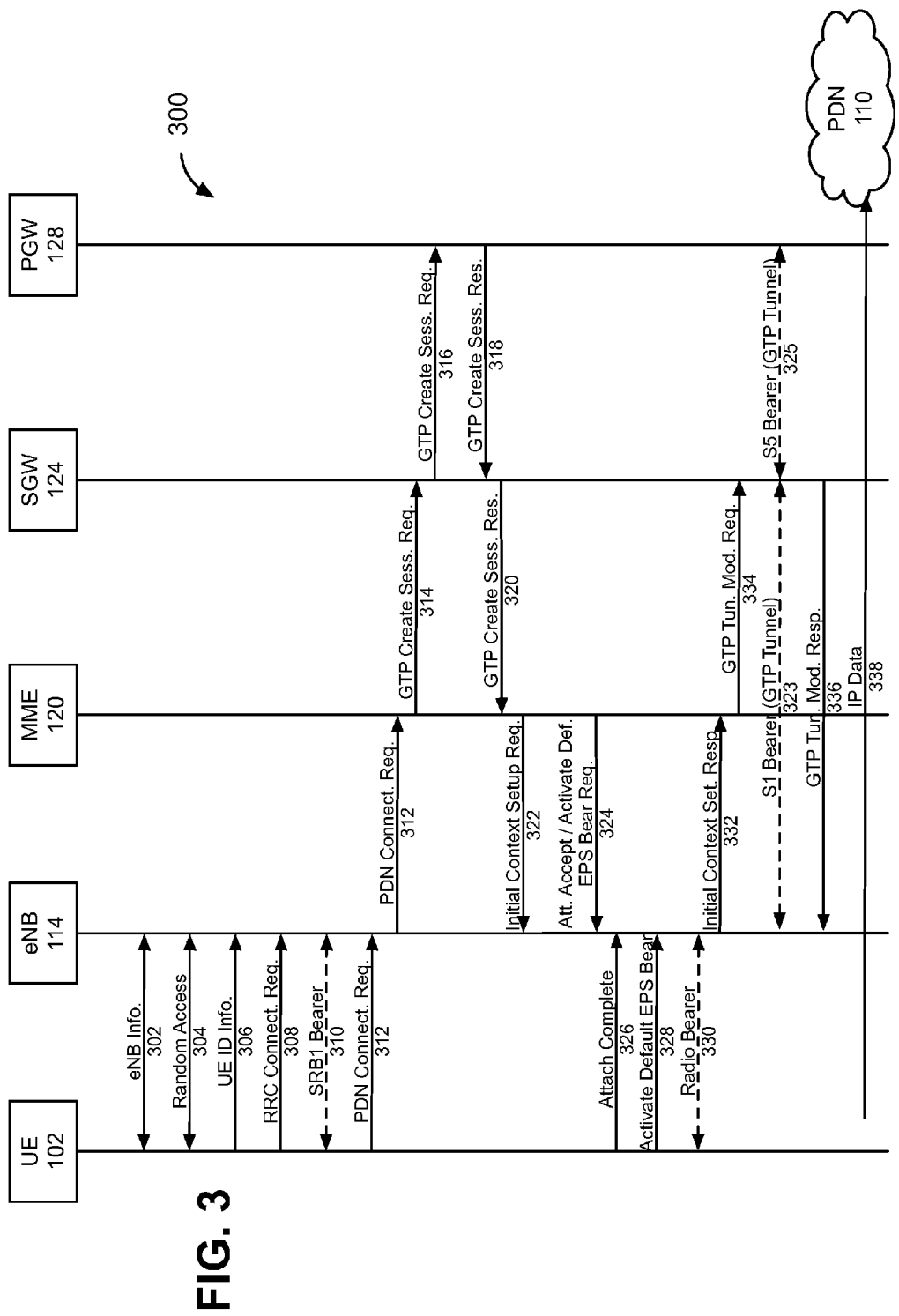
FIG. 3 is a call flow diagram illustrating processing associated with UE attachment in the LTE network of FIG. 1.

FIG. 3 is a call flow diagram illustrating processing associated with UE attachment in LTE network 100. Processing may begin when UE 102 powers up or activates its cellular radio and receives information 302, such as tracking area identification (ID) information, network ID information, cell ID information, etc. from one or more eNBs 114 and identifies possible eNBs to attach to based on the information. UE 102 then synchronizes timing with a selected eNBs 114 and performs a Random Access procedure 304 to connect to one or more nearby eNBs 114 and forwards UE identity information 306 to the selected eNBs 114.

At this point there is no radio bearer established between eNB 114 and UE 102 and no session (user plane) has yet been established between the MME 120 and UE 102 or SGW 124 and the UE 102. To establish an initial radio bearer, UE 102 first exchanges Radio Resource Control (RRC) signaling with eNB 114 to create a session. More specifically, an RRC connection request 308 is transmitted from UE 102 to eNB 114 to establish a low priority signal radio bearer (SRB1) 310. Using SRB1 310, UE 102 transmits a PDN connectivity request NAS message 312 to the eNB 114. NAS message 312 is forwarded by the eNB 114 to the MME 120 for use in authenticating UE 102 on the network, for establishing an EPS bearer, and for acquiring an IP address for the UE 102 from PGW 128.

In response to the PDN connectivity request NAS message 312, MME 120 transmits a GPRS Tunneling Protocol (GTP) Create Session Request message 314 to SGW 124. This message initiates establishment of a GTP tunnel between SGW 124 and eNB 114, referred to as the S1 bearer. The particular SGW 124 is selected by MME 120 based on the Tracking Area ID associated with UE 102 that the eNB 114 was provided during the initial attach procedure 302. The GTP Create Session Request message 314 transmitted by MME 120 includes an EPS Bearer ID assigned to UE 102.

In response to the GTP Create Session Request message 314, SGW 124 transmits another Create Session Request message 316 to PGW 128. This message initiates establishment of a second GTP tunnel between SGW 124 and PGW 128, referred to as the S5 bearer. PGW 128 responds to this message with a Create Session Response message 318 that includes the PGW Address for the user plane, the PGW GTP Tunnel Endpoint ID (TEID) of the user plane, the PGW TEID of the control plane, PDN Type, PDN Address, EPS ID, EPS Bearer QoS, Protocol Configuration Options, Charging Id, the dynamically assigned UE IP address, etc.

Importantly, in LTE, all dynamic IP address allocation is performed by PGW 128 to allow for IP sessions to be maintained even when UEs 120 move between different eNBs 114 and different SGWs 124, a process referred to as mobility.

In response to the Create Session Response message 318 from PGW 128, SGW 124 forwards a GTP Create Session Response message 320 to MME 120 that includes the SGW GTP Tunnel endpoint ID (TEID), the IP address of the SGW, the IP address of UE 120 (as allocated by PGW 128), the EPS Bearer ID, and any bearer QOS values.

MME 120 then forwards values received in the Create Session Response GTP message to eNB 114 in an E-UTRAN radio access bearer (ERAB) Initial Context Setup Request Message 322 along with an Attach Accept and Activate Default EPS Bearer Context Request message 324 destined for UE 102 that includes the fully qualified GTP TEID (FTEID) of the SGW. The Initial Context Setup Request Message 322 triggers formation of GTP tunnels between eNB 114 and PGW 128 for use by UE 102 (the S5 (323) and S1 bearers (325)). The Attach Accept and Activate Default EPS Bearer Context Request message 324 triggers setup of the radio bearer for the session that includes the defined QoS, the Access Point Name (APN), and the UE IP address assigned by the PGW 128.

UE 102 responds with both Attach Complete message 326 and Activate Default EPS Bearer Accept message 328 to eNB 114. These messages inform MME 120 that UE 102 has established the appropriate radio bearer 330 with eNB 114 for the session.

Next, eNB 114 transmits an Initial Context Setup Response message 332 to MME 120 that confirms establishment of the GTP tunnel and also includes a NAS message indicating the attachment of UE 102 to eNB 114. This message causes MME 120 to transmit a GTP Tunnel Modify Bearer Request message 334 to SGW 124 to update the eNB tunnel ID for the default bearer and to provide values for UE 102's user plane IP address and GTP TEID. In response SGW 124 transmits a GTP Tunnel Modify Bearer Response message 336 to eNB acknowledging receipt and updating of its information regarding eNB 114 and UE 102.

Session IP data traffic 338 may then be exchanged between UE 102 and the PDN via the established default bearer (e.g., the established GTP tunnels between eNB 114 and SGW 124 and between SGW 124 and PGW 128) during the life of the session. Utilizing GTP tunnels (e.g., GTP-U tunnels) to facilitate user plane traffic exchange between eNB 114 and PGW 128 requires that additional layers of data be added to any underlying payload or IP packets. For example, additional IP header information must be appended to underlying payload packets.

Collapsed Mobile Architecture

Figure 4:
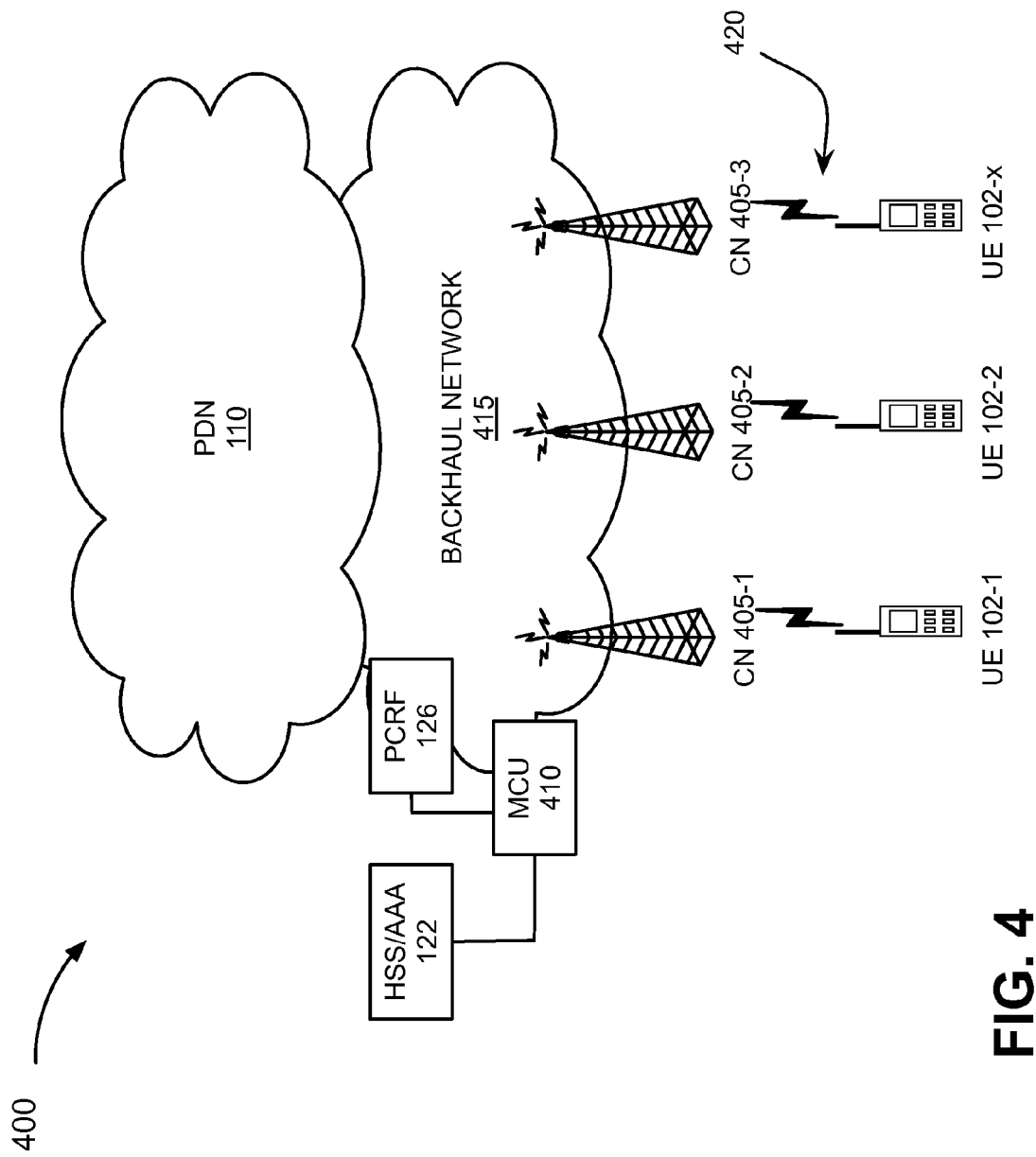
FIG. 4 is a diagram of an exemplary collapsed mobile architecture (CMA) network consistent with embodiments described herein.

Consistent with embodiments described herein, a novel network architecture is provided (hereinafter referred to as a "collapsed mobile architecture" (CMA)) in which a reduced number of components are necessary to provide high speed mobile connectivity, with greater efficiency and reduced cost. FIG. 4 is a diagram of an exemplary CMA network 400 consistent with embodiments described herein. As illustrated, CMA network 400 may include a number of UEs 102, a number of connection nodes (CNs) 405-1 to 405-3, a mobility control unit (MCU) 410, an HSS device 122, a PCRF device 126, and a destination network PDN 110 (e.g., the Internet, a packet network, etc.) coupled together via a backhaul network 415, such as a multiprotocol label switching (MPLS) network. In contrast to LTE network 100 described above, CMA network 400 includes only a single, decentralized device layer (e.g., CNs 405) positioned between UEs 102 and PDN 110.

CMA network 400 is centered around the concept of multi-purpose connection nodes 405. Contrary to LTE eNBs 114 described above, CNs 405 provide a distributed and direct IP user plane between PDN 110 and subscriber UEs 102 via an backhaul network 415. CNs 405 also provide control plane connectivity to MCU 410, thereby enabling configuration and setup of simplified bearer sessions between devices in CMA network 400. For example, in contrast to LTE, CMA architecture requires that no GTP tunnels be established to support user plane creation and to effect transmission and receipt of IP data between PDN 110 and UE 102. This allows for efficient routing of data and seamless handovers between CNs 405 as UEs 102 move about the network.

CNs 405 may be implemented as base stations or access point devices connected to PDN 110, such as via an LTE backhaul (e.g., IP) MPLS network 415. As described below, the backhaul network 415 may further enable CNs 405 to communicate directly with each other. CNs 405 are configured to connect with UEs 102 via a radio connection 420. Consistent with embodiments described herein, radio connection 420 may implement any of a number of available radio access technologies, such as WiFi, LTE (3GPP), WCDMA, CDMA, GSM, WiMax, etc. In this manner, CNs 405 may be access technology agnostic, with support for different access technologies being provided by line cards installed with each CN 405. In addition, other non-radio access technologies may also be implemented.

Figure 5:
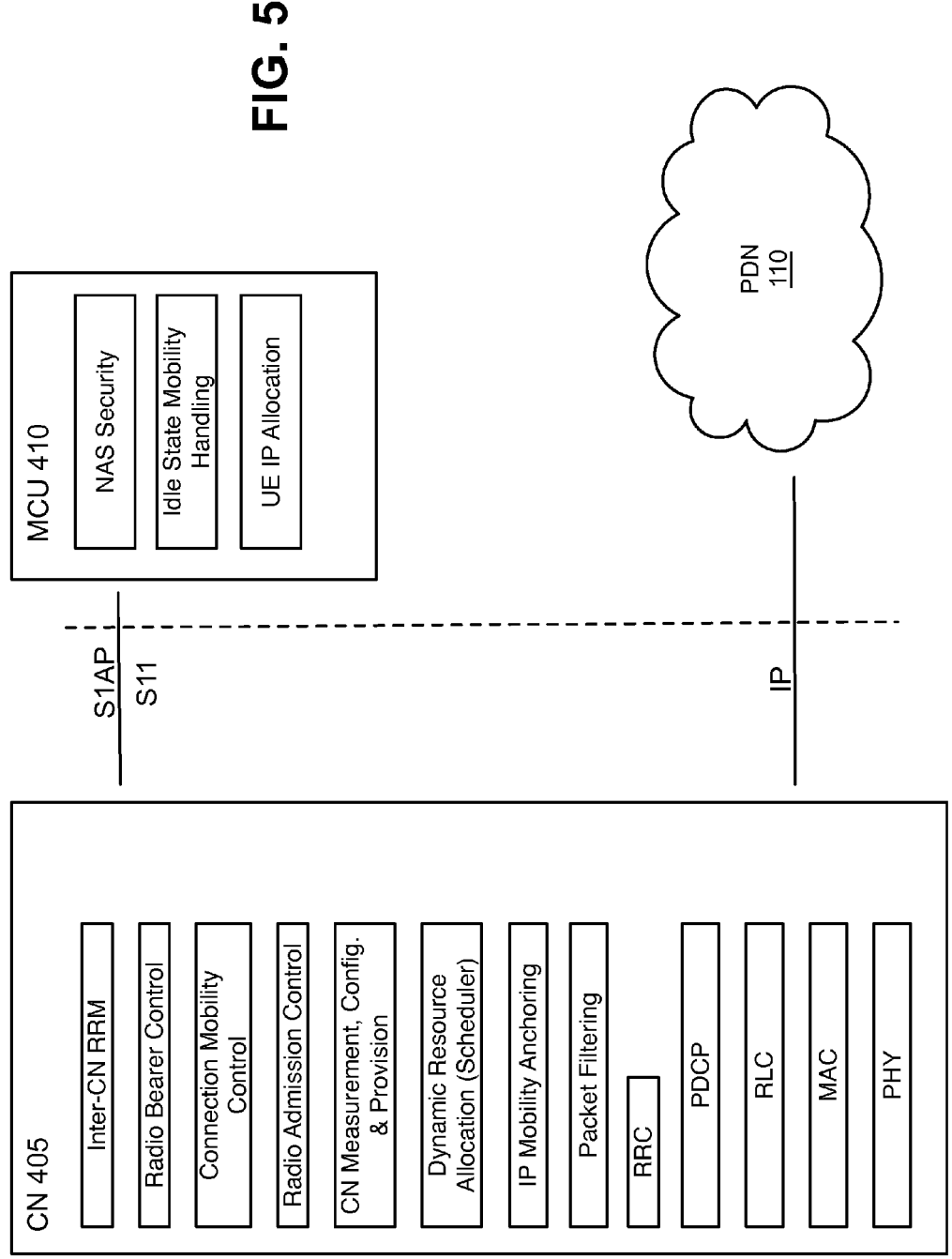
FIG. 5 is a block diagram showing an exemplary functional split between the CNs and the MCU in the CMA network of FIG. 4.

FIG. 5 is a block diagram showing an exemplary functional split between the CNs 405 and MCU 410 in CMA network 400. As shown, CNs 405 host functions for inter-CN radio resource management, Radio Bearer Control, Connection Mobility Control, Radio Admission Control, CN Measurement, Configuration, and Provisioning, and Dynamic allocation of resources to UEs in both uplink and downlink (scheduling). These functions are similar to functions supported by eNBs 114 in LTE network 100 and described in detail above. For example, CN 405 supports timing synchronization and the Random Access procedure to connect to UE 102. CN 405 also supports RRC signaling with UE 102 to establish an initial radio bearer between CN 405 and UE 102 and NAS signaling exchange between UE 102 and MCU 410 for use in authenticating UE 102 on the network and for acquiring an IP address for the UE 102.

Consistent with embodiments described herein, CN 405 also hosts functions for IP mobility anchoring, packet filtering, packet interception and mirroring, deep-packet inspection, among others. In addition, CN 405 may host functions that support inter-CN mobility, such as the routing of information from CN 405-1 to CN 405-2 in circumstances in which an IP session has been previously established through a first CN 405, CN 405-1, and then moved to second CN, CN 405-2. In this manner, mobility management may be performed in a more distributed CN-based manner than described above in relation to LTE network 100. In addition, the CN will route traffic among UEs anchored at the same CN.

This design is in contrast to an LTE design in which such functions are supported in a centralized manner by SGW 124 and PGW 128, respectively. More specifically, as described above, in LTE networks, radio mobility anchoring functions are performed by SGW 124, to ensure that information regarding default or dedicated EPS bearers is maintained when a user moves between eNBs 114, thereby enabling SGW 124 to move GTP tunnel end points as necessary to new eNBs when a UE 102 moves between different eNBs 114.

For example, referring to FIG. 1, when a subscriber moves UE 102 (e.g., UE 102-2) from a first eNB 114 (e.g., eNB 114-1) to a second eNB (e.g., eNB 114-2), any bearers (e.g., GTP tunnels) set up between SGW 124 and the first eNB 114 will no longer be valid and will need to be moved or re-homed. By maintaining an anchor point at SGW 124, it can be ensured that data will continue to be routed through an SGW 124 and onto any newly established radio and EPS bearers created for the new eNB 114. Unfortunately, this architecture further adds to the bottleneck effect described above.

Figure 6:
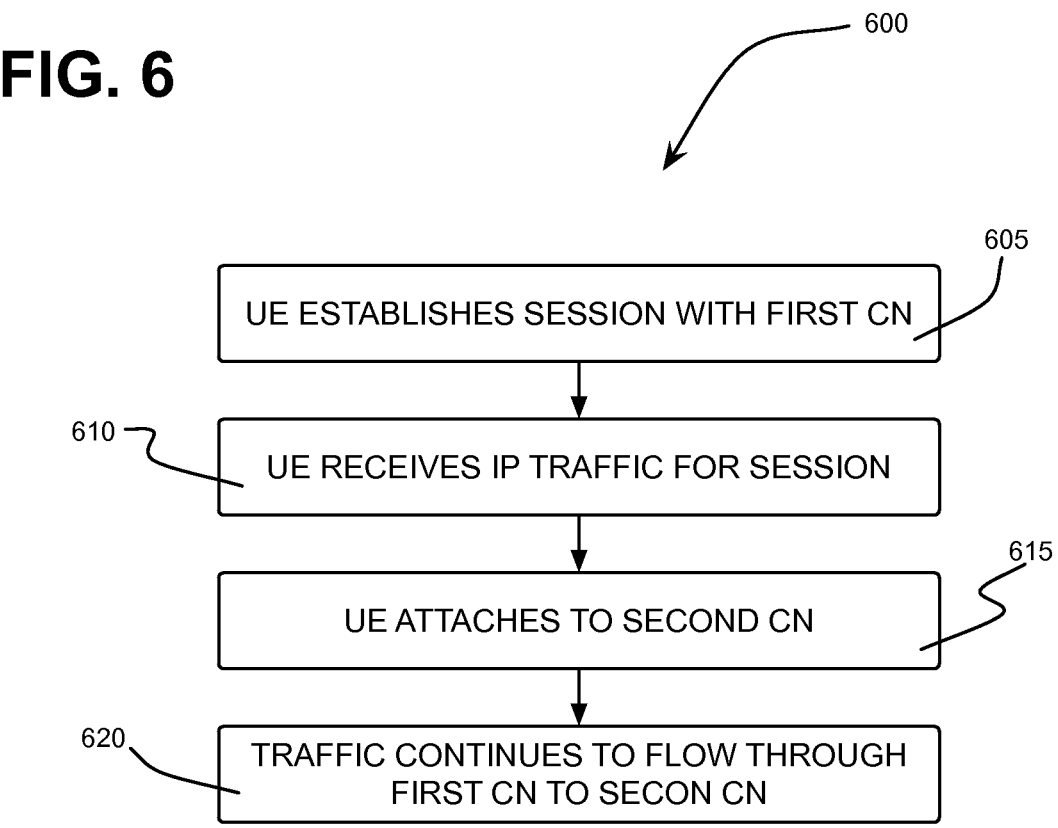
FIG. 6 is a flow diagram illustrating an exemplary process for providing mobility anchoring in the CMA network of FIG. 4.

In contrast, referring to FIG. 4, because CMA 400 does not utilize an SGW 124 or a PGW 128 as centralized discrete network elements, and does not require the creation of GTP tunnels, mobility anchoring may be provided directly at an initial CN 405 (e.g., a CN 405 through which a data session is initiated). FIG. 6 is a flow diagram illustrating an exemplary process 600 for providing mobility anchoring in CMA network 400. As shown, processing may begin with UE 102-2 initiating a data session (e.g., may "attach") with a particular CN 405 (e.g., CN 405-2) (block 605) and may begin receiving IP traffic via CN 405-2 (block 610). Next, UE 102-2 may attach to a second CN 405 (e.g., CN 405-3) (block 615). For example, the user may move UE 102-2 to a geographic region served by CN 405-3. Traffic for the established session (e.g., initially established with CN 405-2) may be received at CN 405-2 and forwarded to CN 405-3 via backhaul network 415 (block 620). In this manner, the initial CN 405-2 performs a function similar to SGW 124, described above, which is to forward traffic received at CN 405-2 to the new subscriber anchor point CN 405-3 during the transition from CN 405-2 to CN 405-3. This ensures that no data is lost throughout the duration of the session. For example, assuming that IP backhaul network 415 includes an MPLS network, it may take time to propagate updates to identify new label switched paths (LSPs providing connectivity the to UE 102-2. To avoid data loss, existing LSPs associated with UE 102-2 and CN 405-2 (the initial attachment CN) may be maintained, with the data being subsequently delivered between CN 405-2 and 405-3.

MCU 410 hosts the functions for NAS signaling, NAS security, idle mode UE reachability, tracking area list management, roaming, and authentication. These functions are similar to functions provided by MME in LTE network 100. More specifically, MCU 410 may provide functionalities relating to idle mode tracking and paging procedures (e.g., including retransmissions) for UE 102. For example, MCU 410 may maintain information regarding a current state of UE 102 (e.g., powered on, location, identification of current CN 405 to which it is attached, etc.) based on NAS messages received from UE 102 via a CN 405. In addition, MCU 410 may authenticate UE 102 (e.g., via interaction with HSS 122).

Furthermore, MCU 410 may be configured to check authorization of UE 102 to connect to a service provider's PLMN and may enforce roaming restrictions for UE 102. MCU 410 may also be a termination point in network 400 for ciphering/integrity protection for NAS signaling and may handle security key management.

Figure 7:
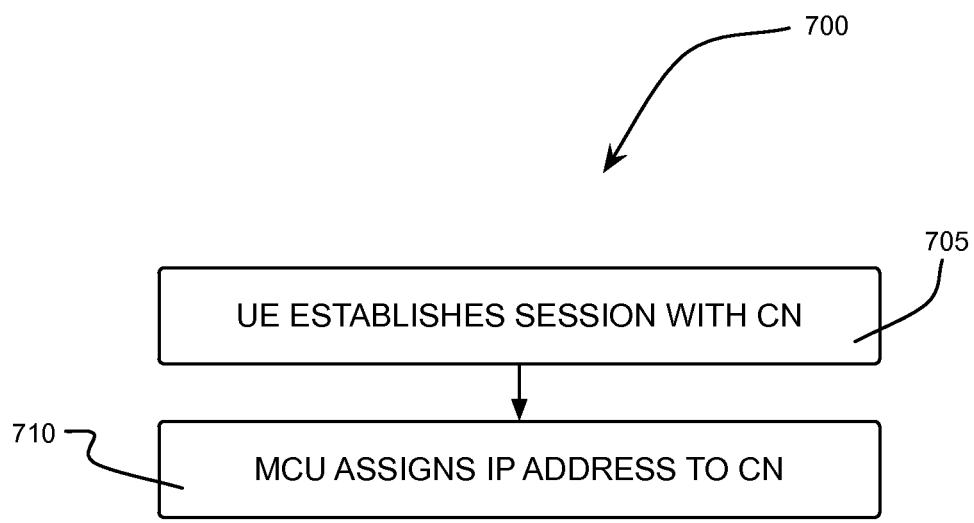
FIG. 7 is a flow diagram of an exemplary process for providing dynamic Internet Protocol (IP) allocation in the CMA network of FIG. 4.

In addition, consistent with embodiments described herein, MCU 410 may host functions for UE dynamic IP address allocation. In contrast to the embodiments described herein, IP address allocation is provided in a centralized manner by PGW 128 in LTE network 100. FIG. 7 is a flow diagram of an exemplary process 700 for providing dynamic IP allocation in CMA network 400. Initially, UE 102 may attach to a CN 405 (block 705). Next, in response to registration messages regarding UE 102 received from CN 405, MCU 410 may identify and assign a particular IP address to UE 102 (block 710). In some implementations, MCU 410 may include a dynamic host control protocol (DHCP) server configured to identify and distribute the assigned IP address. In some embodiments, the particular assigned IP address may be maintained throughout the time in which UE 102 is attached to any CN 405 in network 400, for at least some network traffic related to some applications. In other embodiments, IP address assignments may be assigned on a regional basis. For example, each MCU 410 may be allocated a particular range of IP addresses for distribution to connected UEs 102. When a UE 102 moves from a region served by a first MCU 410 to a region served by a second MCU 410, re-attachment may be performed and a new IP address may be allocated. In some embodiments, UE 102 may maintain two different IP addresses, one from the older MCU region, and the other from the new MCU region. In such an implementation, each MCU region may include a gateway device that connects to a set of CNs 102 via the IP backhaul network 415. During transition from one CN 405 to another CN 405, in the same MCU region, the IP address associated with UE 102 is not changed but MCU 410 may update the gateway device with the CN 405 through which the IP address is reachable.

Figure 8:
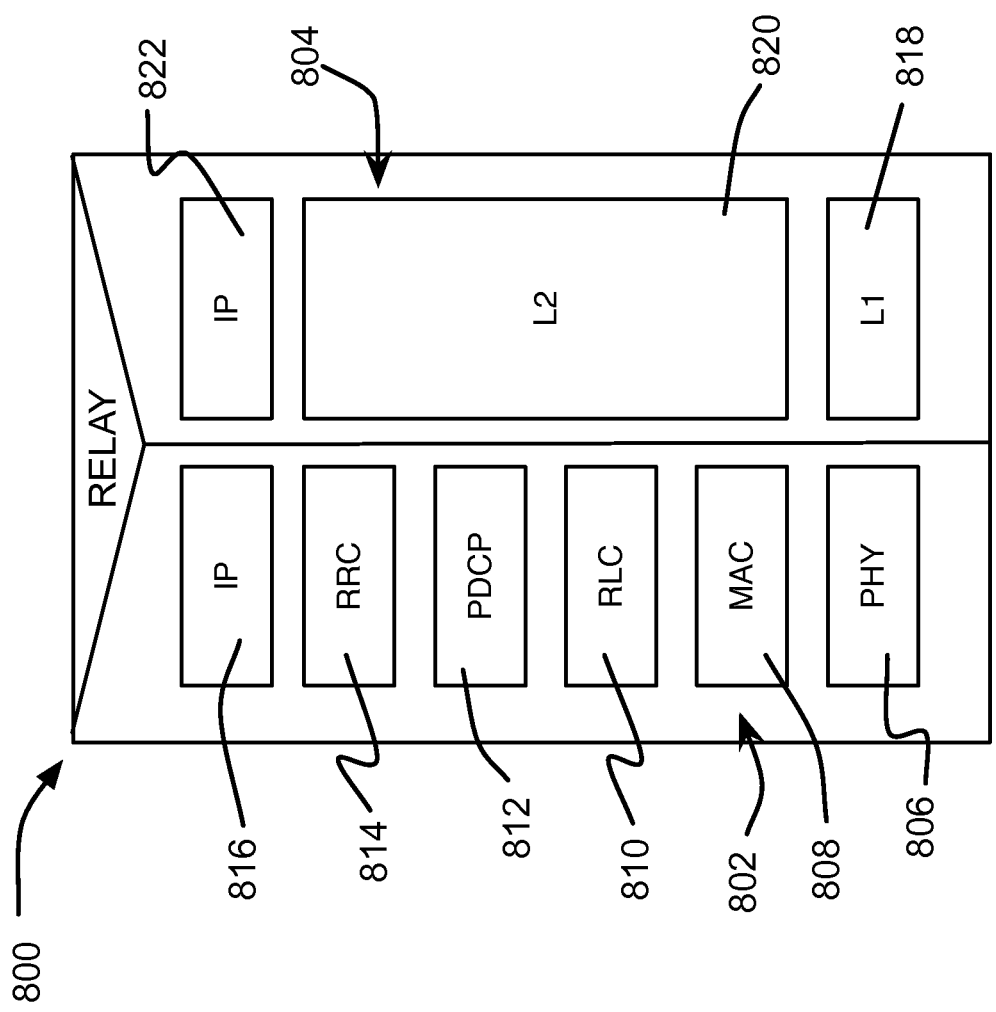
FIG. 8 illustrates an exemplary user plane protocol stack implemented in the CN of FIG. 4.

FIG. 8 illustrates an exemplary user plane protocol stack 800 implemented in CN 405. More particularly, user plane protocol stack 800 shows a radio interface protocol stack 802 on the left side of protocol stack 800 and a network interface protocol stack 804 on the right side of protocol stack 800. In other embodiments, different left side protocols may be implemented for different access technologies. As shown, radio interface protocol stack 802 includes a PHY layer 806, a MAC (medium access control) layer 808, a RLC (radio link control) protocol layer 810, a PDCP (packet data convergence protocol) layer 812, an RRC (radio resource control) layer 814, and an IP layer 816. Network interface protocol stack 804 includes an L1 layer 818, an L2 layer 820, and IP layer 822.

On radio side 802, the MAC, RLC, RRC, and PDCP layers 806-812 together define the L2 layers of the protocol stack, since these layers all relate to data link level processing. Moreover, the L1, MAC, RLC, and PDCP layers 806-812 comprise protocol layers relating to radio communications between CN 405 and UE 102. These protocol layers are terminated at the CN 405 in the uplink direction or originate at CN 405 in the downlink direction and effectively enable establishment and traffic flow across the radio interface between CN 405 and UE 102.

The L1 or physical (PHY) layer 806 provides information transfer services to upper layers on a physical channel. PHY layer 806 is coupled with MAC layer 808 through transport channels. Data is transferred between MAC layer 808 and PHY layer 806 via transport channels. The transport channels are classified by how and with what characteristics data are transferred over the radio interface.

MAC layer 808 provides a mapping between logical channels and transport channels, and multiplexing/demultiplexing of data units. MAC layer 808 also provides services to RLC layer 810 through logical channels. These logical channels may include control channels for the transfer of control plane information (e.g., destined for MCU 410) and traffic channels for the transfer of user plane information to PDN 110. The functions of RLC layer 810 include concatenation, segmentation and reassembly of RLC data units, and also supports QoS guarantees and error correction. PDCP layer 812 provides for the transfer of user data, header compression/decompression, and ciphering/deciphering. IP layer 814 is a network layer protocol that provides IP datagrams for routing to network destinations based on IP addresses.

On the network side 804, L1 layer 818 defines physical connections for CN 405, such as gigabit Ethernet cables, Ethernet cables, fiber optical interfaces (e.g., SONET/SDH), etc. L2 layer 820 corresponds to the physical specification in L1 layer 818. For example, an L1 layer defining gigabit Ethernet specifications would correspond to an Ethernet L2 layer. Similar to IP layer 814 on radio side 802, IP layer 822 on network side 804 is a network layer protocol that provides IP datagrams for routing to network destinations based on IP addresses.

In contrast to user plane protocol stacks implemented in eNBs 114, the protocol stack for CNs 405 does not require a GTP layer for delivering traffic to/from GTP tunnel for delivery to SGW 124 and ultimately to PGW 128. Rather, IP layer 822 may provide IP traffic directly to backhaul network 415. In some implementations, one or more additional protocol layers relating to MPLS or other backhaul network-related processing may be added to network side protocol stack 804 to facilitate delivery of user data to PDN 110 and vice versa.

In operation, when a UE 102 comes into range of a CN 405, the particular CN 405 provides Radio Resource Management and establishes radio bearer control, radio admission control, and allocation of uplink and downlink to the particular UE 102.

Consistent with implementations described herein, CN 405 is also responsible for performing various IP-related functions relating to a requesting UE 102. For example, CN 405 may perform dynamic host control protocol (DHCP) functions, domain name server (DNS) functions, packet filtering and marking functions, and may facilitate the lawful interrupt of packet data. Such functions are relegated to a centralized PGW 128 in an LTE network, thereby potentially introducing bottlenecks or other latency effects. By moving such functions away from a centralized PGW device, a native IP network may be established that supports significantly faster control plane signaling and user plane data exchange, in comparison to LTE networks. In addition, CN 405 may provide accounting functionality relating to UE 102, such as bandwidth monitoring, usage statistics, etc.

In addition to the radio bearer and UE IP functions, CN 405 is also responsible for maintaining a user plane interface with PDN 110, across which IP traffic from UEs 102 and to UE 102 will travel. For example, CN 405 may have a direct interface to backbone IP/MPLS network 415. Accordingly, in such an implementation, CN 405 may operate to append MPLS labels onto outgoing IP data packets received from UE 102 and remove or "pop" MPLS labels from data received from network 415 and destined for UE 102. In this manner, each CN 405 may act as a label edge router (LER) in MPLS network 415. For example, CN 405 may maintain tables that map outgoing IP addresses (or address prefixed to particular labels) and incoming labels to particular labels and UEs 102, respectively.

This operation is in contrast to LTE networks in which GTP tunnels are established between PGW 128 and SGW 124 and between SGW 124 and eNB 114, as described above in relation to the S5 and S1 bearers. Such GTP tunnels typically require a GTP/UDP/IP stack which introduce significant overhead onto each packet, e.g., on the order of 54 bytes for each additional layer, for a total of 108 bytes. By leveraging CN 405 as a cell site or close-to-cell-site LER, this additional overhead is avoided. Rather, all that is required for efficient packet transmission is the appending of an appropriate label on each IP packet. In contrast to GTP-related headers, typical MPLS labels are 32 bits or 4 bytes in length, which represents a significant reduction. In addition, the packet may be forward as a native IP packet, i.e., without an MPLS header.

In addition, forwarding of IP traffic directly onto IP/MPLS network 415 enables traffic level of varying QoS based on appropriate QoS marking in the IP packet header and/or MPLS header, depending whether the packet is labeled or not. This is in contrast to LTE in which additional dedicated bearers need to be established prior to commencement of services having particular QoS requirements, such as VoIP, streaming media, etc., albeit classification and marking policies may continue to be communicated in this case to a particular CN 405 (and/or CN gateway) to take an appropriate action.

Figure 9:
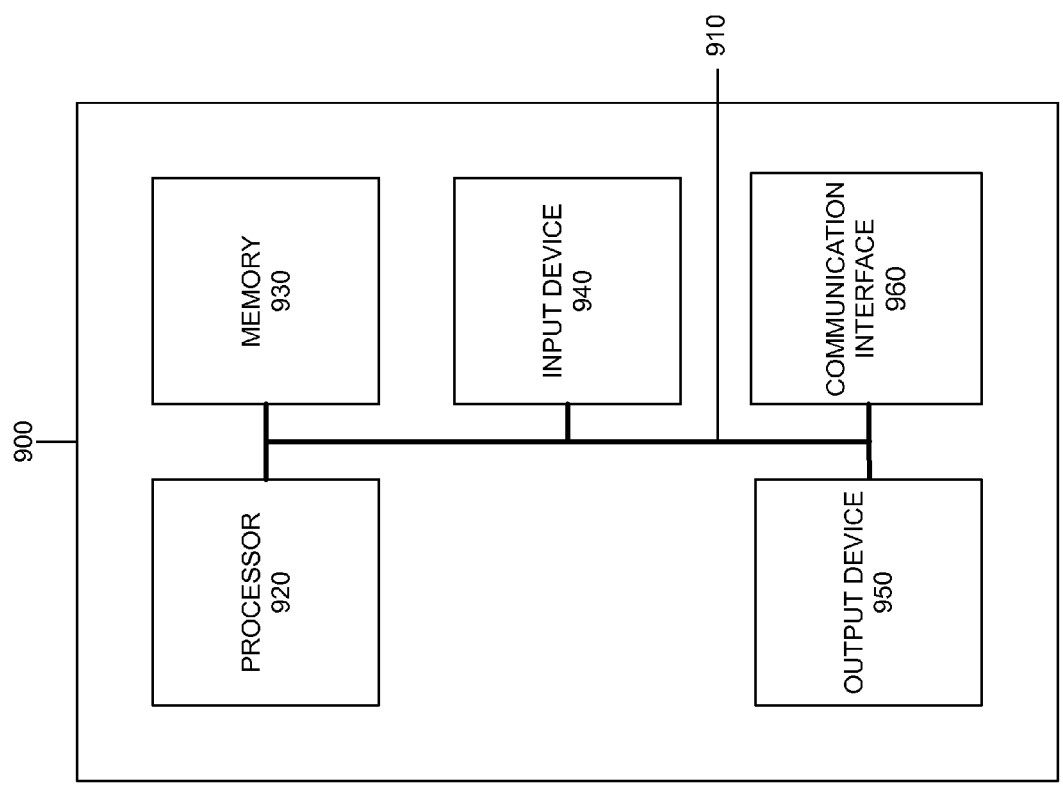
FIG. 9 is a diagram of exemplary components of a device that corresponds to one of the devices of the CMA network of FIG. 4.

FIG. 9 is a diagram of exemplary components of a device 900 that may correspond to one of the devices of network 400, such as CN 405 and/or MCU 410. As illustrated, device 900 may include a bus 910, a processor 920, a memory 930, an input device 940, an output device 950, and a communication interface 960.

Bus 910 may permit communication among the components of device 900. Processor 920 may include one or more processors or microprocessors that interpret and execute instructions. In other implementations, processor 920 may be implemented as or include one or more application specific integrated circuits (ASICs), field programmable gate arrays (FPGAs), or the like.

Memory 930 may include a random access memory (RAM) or another type of dynamic storage device that stores information and instructions for execution by processor 920, a read only memory (ROM) or another type of static storage device that stores static information and instructions for the processor 920, and/or some other type of magnetic or optical recording medium and its corresponding drive for storing information and/or instructions.

Input device 940 may include a device that permits an operator to input information to device 900, such as a keyboard, a keypad, a mouse, a pen, a microphone, one or more biometric mechanisms, and the like. Output device 950 may include a device that outputs information to the operator, such as a display, a speaker, etc.

Communication interface 960 may include any transceiver-like mechanism that enables device 900 to communicate with other devices and/or systems. For example, communication interface 960 may include mechanisms for communicating with other devices, such as other devices of network 100.

As described herein, device 900 may perform certain operations in response to processor 920 executing software instructions contained in a computer-readable medium, such as memory 930. A computer-readable medium, as the term is used herein, is intended to be broadly interpreted to include, for example, a memory, a storage medium, a CD, a DVD, a Blu-ray disc, or another type of tangible storing medium. The software instructions may be read into memory 930 from another computer-readable medium or from another device via communication interface 960. The software instructions contained in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

Although FIG. 9 shows exemplary components of device 900, in other implementations, device 900 may contain fewer, different, differently arranged, or additional components than those depicted in FIG. 9. Alternatively, or additionally, one or more components of device 900 may perform one or more other tasks described as being performed by one or more other components of device 900.

Figure 10:
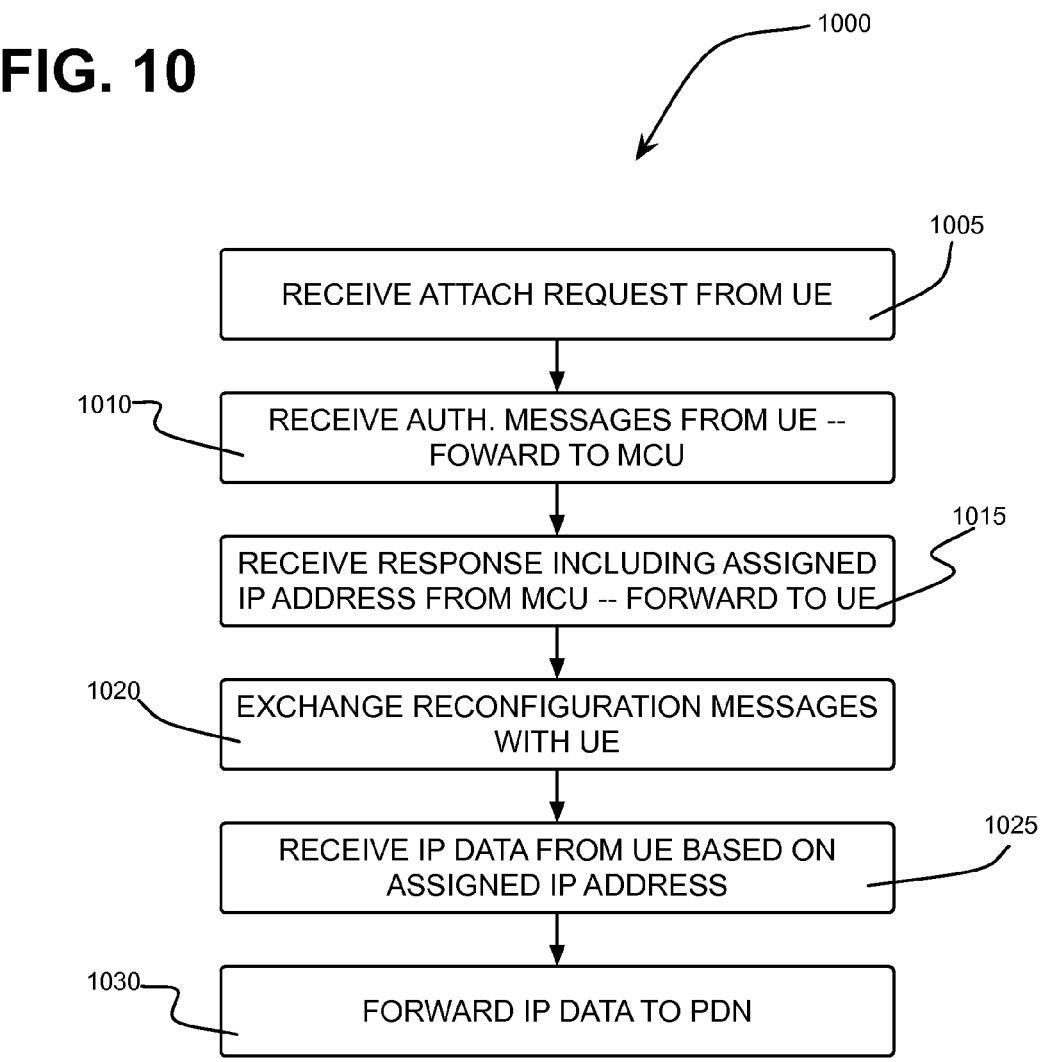
FIG. 10 is a flow diagram illustrating an exemplary process for establishing a communication session in a manner consistent with embodiments described herein.
Figure 11:
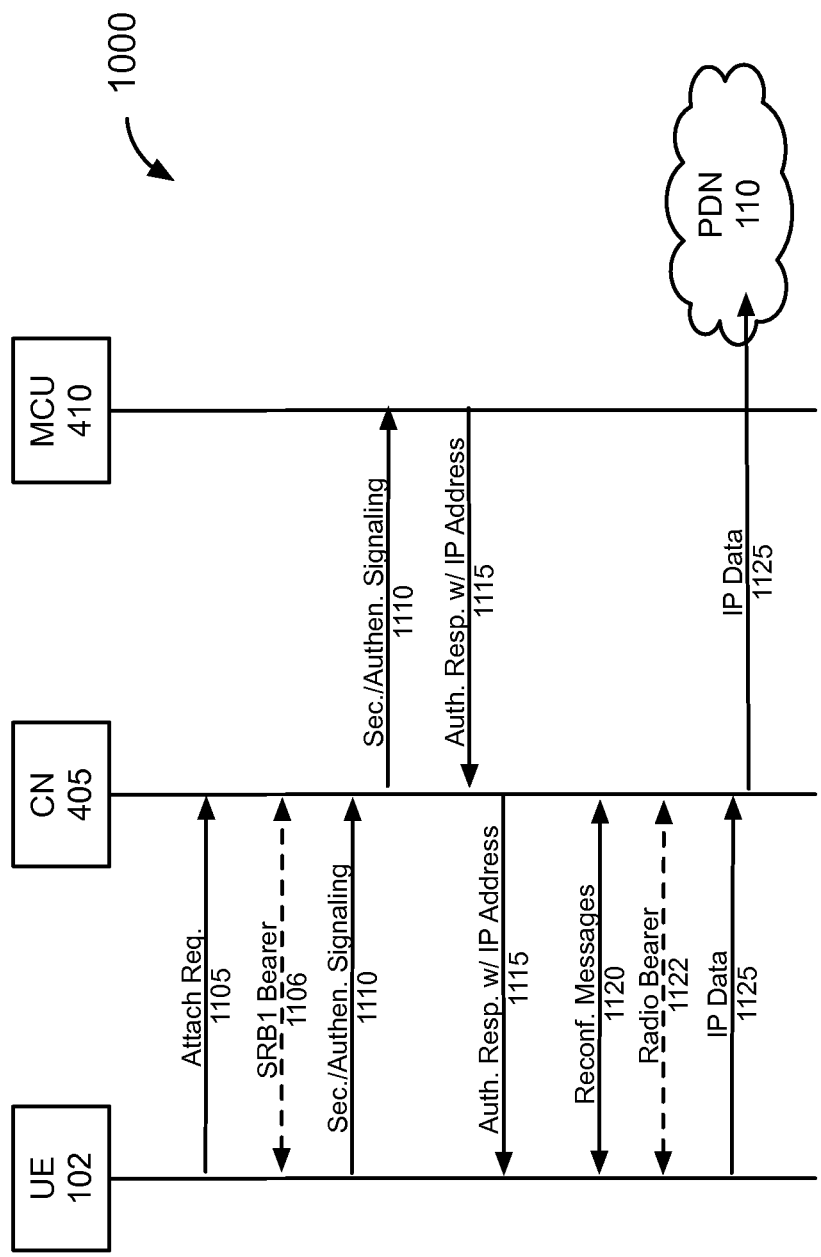
FIG. 11 is a call flow diagram illustrating the process of FIG. 10.

FIG. 10 is a flow diagram illustrating an exemplary process 800 for establishing a communication session in a manner consistent with embodiments described herein. FIG. 11 is a call flow diagram illustrating the process of FIG. 10. According to embodiments described herein, process 1000 may be performed by CN 405 and/or MCU 410. Process 1000 may begin upon receipt, by CN 405, of an attach or connection request 1105 from UE 102 (block 1005). For example, as described above, in an LTE-based radio access implementation, CN 405 and UE 102 may exchange RRC signaling to establish an initial radio bearer (SRB1 bearer 1106) between CN 405 and UE 102 to allow subsequent session signaling to be exchanged. In other implementations, different kinds of initial attachment signaling may be received, depending on the access technology being employed.

CN 405 may receive security/authentication signaling messages 1110 from UE 102 via the initial radio bearer and may forward the security/authentication signaling messages 1110 to MCU 410 (block 1010). For example, CN 405 may receive NAS signaling messages from UE 102 relating to registration, attachment, and authentication and forward the NAS signaling messages to MCU 410 via IP backhaul network 415. CN 405 may receive one or more responsive messages 1115 relating to UE 102 from MCU 410 and may forward the messages 1115 to UE 102 (block 1015). For example, CN 405 may receive a message from MCU 410 that acknowledges authentication of UE 102 and identifies an IP address assigned to UE 102 by MCU 410. In one embodiment, MCU 410 may provide the assigned IP address in a message exchanged via an S11 interface between MCU 410 and CN 405. The message 1115 including the assigned IP address is then forwarded to UE 102 for use in generating subsequent IP packets for transmission destined for delivery on PDN 110. Message 1115 may also be forwarded to the CN gateway to enable forwarding of packets from the PDN 110 to a correct CN 405. The CN gateway provides the path for a particular CN 405 to communicate with other CNs 405 and the PDN 110. The CN gateway may also include UE specific policies.

Following receipt of the messages from MCU 410, CN 405 may exchange reconfiguration messages 1120 with UE 102 (block 1020). The reconfiguration messages 1120 may facilitate establishment of the radio bearer 1122 for use during the ensuing session and may provide the assigned IP address information to UE 102.

Once the radio bearer has been configured and an IP address allocated, CN 405 may receive IP data 1125 from UE 102 via the established bearer, in which the source IP address includes the IP address assigned by MCU 410 (block 1025). For example, the L1, MAC, RLC, and PDCP layers 806-812 in radio user data plane stack 802 may process received signals from UE 102 via the established radio bearer and identify the IP data (e.g., packet data) included therein.

CN 405 may then forward the identified IP data 1125 to PDN 110 via backhaul network 415 (block 1030). For example, the L1, L2, and IP layers 818-822 on the network side 804 of user data plane stack 800 may forward the IP data via any implemented transport layer or routing protocols in place. In the MPLS example, CN 405 may be configured to identify a destination address and/or protocol/port information from the IP data, determine an available label switched path (LSP) based on the destination address and protocol/port information, apply a label to the IP data based on the identified LSP and forward the IP data to a next hop label switching router (LSR) in backhaul network 415 for eventual delivery to PDN 110. Further, in one implementation, identified LSPs, as referenced by particular MPLS labels, may be mapped or associated with a particular radio bearer established between CN 405 and UE 102. In this manner, traffic received by CN 405 on the MPLS tunnel may be forwarded to a particular UE 102.

By providing a high speed mobile architecture having a significantly simplified structure in comparison to an LTE network architecture, efficient transmission of data may be enabled without undesirable overhead requirements or centralized bottlenecks. Consistent with exemplary embodiments, such a mobile architecture includes a plurality of distributed and interconnected CNs operatively coupled to a MCU and a PDN (e.g., the Internet) via an IP backhaul network. User devices (termed UEs herein) may connect or attach to the CNs via any of a number of suitable access technologies. Once attached, the UEs may communicate with the MCU via respective CNs to authenticate with the network and receive an IP address assigned by the MCU. The UEs may then transmit IP data to the PDN directly via the CNs using the assigned IP address.

Unlike an LTE architecture, IP data does not travel to PDN through hierarchical serving and PDN gateways (SGWs/PGWs), thus reducing latency introduced by such bottlenecks. Moreover, by supporting direct IP-based communication between CNs and the PDN, overhead requirements associated with the SGWs and PGWs are avoided.

Although FIGS. 10 and 11 illustrates an exemplary process 1000 for establishing a communication session in a manner consistent with embodiments described herein, according to other implementations, process 1000 may include additional operations, fewer operations, and/or different operations than those illustrated in FIG. 10 and described.

The foregoing description of implementations provides illustration, but is not intended to be exhaustive or to limit the implementations to the precise form disclosed. Accordingly, modifications to the implementations described herein may be possible. For example, as previously described, the collapsed mobile architecture described herein may be implemented in networks other than LTE-based or even radio-based networks.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the processes illustrated in FIGS. 6, 7, 8, and 9, the order of the blocks or signals/messages may be modified in other implementations. Further, non-dependent blocks may be performed in parallel. Additionally, with respect to other processes described in this description, the order of operations may be different and/or operations may be performed in parallel according to other implementations.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware, such as one or more processors, one or more microprocessors, one or more ASICs, one or more FPGAs, etc., a combination of hardware and software, or a combination with firmware, etc.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A system, comprising:
    a plurality of connection nodes each comprising an access interface and at least one network interface;
    a backhaul network coupled to each of the plurality of connection nodes; and
    a mobility control unit coupled to each of the plurality of connection nodes via the backhaul network,
    wherein the mobility control unit comprises an Internet Protocol (IP) address server,
    wherein each of the plurality of connection nodes is configured to receive attachment requests from at least one user device,
    wherein the mobility control unit is configured to:
        receive first control plane signals from the plurality of connection nodes based on the attachment requests,
        assign an IP address to each of the at least one user devices, based on the received first control plane signals, and
        transmit second control plane signals to the connection nodes based on the attachment requests, wherein each second control plane signal includes the IP address assigned to one of the at least one user device.

2. The system of claim 1, wherein the IP address server comprises a dynamic host control (DHCP) server.

3. The system of claim 1, wherein the backhaul network comprises a multiprotocol label switching (MPLS) network or a native IP network.

4. The system of claim 1, wherein the backhaul network is coupled to a packet data network.

5. The system of claim 4, wherein the mobility control unit, in response to the first control plane signals, does not establish one or more tunnels between any of the plurality of connection nodes and the packet data network.

6. The system of claim 1, wherein the mobility control unit is further configured to perform authentication and registration of the at least one user device based on the first control plane signals.

7. The system of claim 6, wherein the mobility control unit is further configured to perform idle mode tracking and paging processing relating to the at least one user device.

8. The system of 1, wherein the access interface comprises a radio interface.

9. The system of claim 1, wherein the network interface comprises an Ethernet interface.

10. The system of claim 1, wherein the plurality of connection nodes are configured to perform IP mobility anchoring, such that attachment to a second connection node by a first user device following attachment to a first connection node by the first user device causes data to pass to the second connection node via the first connection node.

11. A method, comprising:
    receiving, by a base station device, an attachment request from a user equipment (UE) via an access technology;
    establishing, by the base station device, an access bearer based on the attachment request;
    receiving, from the UE and by the base station device, first control plane messages for authenticating the UE via the access bearer;
    forwarding, by the base station device, the first control plane signals to a mobility control unit (MCU) via a network interface, wherein the MCU is coupled to a plurality of base station devices via a backhaul network;
    receiving, by the base station device, second control plane messages from the MCU indicating that the UE has been authenticated,
    wherein the second control plane messages include an Internet Protocol (IP) address assigned to the UE by the MCU;
    forwarding, by the base station device, the IP address to the UE;
    receiving, by the base station device, IP data from the UE based on the IP address; and
    forwarding, by the base station device, the IP data to a packet data network.

12. The method of claim 11, wherein receiving the attachment request further comprising receiving radio resource control (RRC) signaling from the UE.

13. The method of claim 11, wherein the first and second control plane message comprise non-access stratum (NAS) messages.

14. The method of claim 11, wherein the MCU comprises a dynamic host control protocol (DHCP) server for assigning the IP address.

15. The method of claim 11, wherein the network interface comprises a multiprotocol label switching (MPLS) network interface or a native IP interface.

16. The method of claim 15, wherein the MPLS network interface is operatively coupled to the packet data network.

17. The method of claim 15, wherein the forwarding the IP data to the packet data network further comprises:
    identifying a destination IP address associated with the IP data;
    identifying a label switched path (LSP) based on at least the destination IP address;
    applying a label to the IP data based on the identified LSP; and
    forwarding the IP data to a next hop.

18. A connection node, comprising:
    a radio interface for wirelessly connecting to a user device; and
    one or more network interfaces for connecting to a backhaul network,
    wherein the backhaul network is coupled to a mobility control unit (MCU) and a packet data network, wherein the MCU is coupled to a plurality of base station devices via a backhaul network,
    wherein the connection node is further configured to:
        receive, from the user device via the radio interface, first control plane messages for authenticating the user device;

forward the first control plane signals to the MCU via the one or more network interfaces;

receive second control plane messages from the MCU indicating that the user device has been authenticated;

wherein the second control plane messages include an Internet Protocol (IP) address assigned to the user device by the MCU;

forward the IP address to the user device via the radio interface;

receive IP data from the user device via the radio interface based on the IP address; and forward the IP data to a packet data network via the one or more network interfaces.

19. The connection node of claim 18, wherein the one or more network interfaces comprise an Ethernet interface.

20. The connection node of claim 18, wherein the connection node is further configured to perform IP mobility anchoring, such that attachment to a second connection node by the user device following initial attachment to the connection node causes IP data to pass to the second connection node via the connection node.

\* \* \* \* \*